(12) United States Patent
Berent et al.

(10) Patent No.: US 8,977,074 B1
(45) Date of Patent: Mar. 10, 2015

(54) URBAN GEOMETRY ESTIMATION FROM LASER MEASUREMENTS

(75) Inventors: Jesse Berent, Zurich (CH); Daniel Filip, Zurich (CH); Luciano Sbaiz, Zurich (CH)

(73) Assignee: Google Inc., Mountain View, CA (US)

( * ) Notice: Subject to any disclaimer, the term of this patent is extended or adjusted under 35 U.S.C. 154(b) by 722 days.

(21) Appl. No.: 13/247,718

(22) Filed: Sep. 28, 2011

Related U.S. Application Data

(60) Provisional application No. 61/387,931, filed on Sep. 29, 2010.

(51) Int. Cl.
*G06K 9/00* (2006.01)

(52) U.S. Cl.
USPC ........... 382/294; 382/103; 382/154; 382/276; 382/285; 382/293; 345/419; 345/629; 345/632; 345/633; 345/634

(58) Field of Classification Search
None
See application file for complete search history.

(56) References Cited

U.S. PATENT DOCUMENTS

| | | | | |
|---|---|---|---|---|
| 8,209,121 | B1 * | 6/2012 | Ogale | 701/495 |
| 2007/0177011 | A1 * | 8/2007 | Lewin et al. | 348/118 |
| 2011/0242271 | A1 * | 10/2011 | Ogale et al. | 348/36 |

OTHER PUBLICATIONS

Sequeira et al. "3D Reality Modelling: Photo-Realistic 3D Models of Real World Scenes", 2002, Proceedings of the First International Symposium on 3D Data Processing Visualization and Transmission, pp. 1-8.*
Vincent, "Taking online maps down to street level", 2007, IEEE Computer, vol. 40, No. 12, pp. 118-120.*
Torii et al. "From Google Street View to 3D City Models", 2009 IEEE 12th International Conference on Computer Vision Workshops, pp. 2188-2195.*
Anguelov et al., Google Street View: Capturing the World at Street Level, Jun. 2010, Computer, v.43 n.6, p. 32-38.*
Xiao et al., Image-based Street-side City Modeling, Dec. 2009, ACM Transactions on Graphics, vol. 28, No. 5, Article 114.*
Micusik et al. "Piecewise planar city 3D modeling from street view panoramic sequences," Jun. 2009, Computer Vision and Pattern Recognition, pp. 2906-29125.*
Kada et al. Privacy-Enabling Abstraction and Obfuscation Techniques for 3D City Models, Nov. 3, 2009, In Proceedings of the 2nd SIGSPATIAL ACM GIS 2009 International Workshop on Security and Privacy in GIS and LBS (Springl '09).*

* cited by examiner

*Primary Examiner* — Matthew Bella
*Assistant Examiner* — Jason Heidemann
(74) *Attorney, Agent, or Firm* — Dority & Manning, P.A.

(57) ABSTRACT

Photographic images can be used to enhance three-dimensional (3D) virtual models of a physical location. In an embodiment, a method of generating a 3D scene geometry includes obtaining a first plurality of images and corresponding distance measurements for a first vehicle trajectory; obtaining a second plurality of images and corresponding distance measurements for a second vehicle trajectory, the second vehicle trajectory intersecting the first vehicle trajectory; registering a relative vehicle position and orientation for one or more segments of each of a first vehicle trajectory and a second vehicle trajectory; generating a three-dimensional geometry for each vehicle trajectory; mapping the three-dimensional geometries for each vehicle trajectory onto a common reference system based on the registering; and merging the three-dimensional geometries from both trajectories to generate a complete scene geometry.

10 Claims, 8 Drawing Sheets

URBAN GEOMETRY ESTIMATION FROM LASER MEASUREMENTS

CROSS REFERENCE TO RELATED APPLICATIONS

The present application claims the benefit of U.S. Provisional Patent Application No. 61/387,931, filed Sep. 29, 2010, entitled "Urban Geometry Estimation from Laser Measurements" by Jesse Berent, Daniel Filip, and Luciano Sbaiz, which is incorporated herein by reference in its entirety.

FIELD

Embodiments relate to three-dimensional rendering of image data.

BACKGROUND

Panoramic images of buildings, such as those provided by STREET VIEW™, produced by Google Inc. of Mountain View, Calif., allow a user to obtain panoramic views from various positions along many streets in the world. The images may be obtained by interpolating and warping images collected by a set of cameras mounted on vehicles. The vehicles are driven along regions of interest while images and the vehicle locations are recorded. However, the panoramic images alone may not provide a sufficiently realistic visual experience for a user.

BRIEF SUMMARY

Photographic images can be used to enhance three-dimensional (3D) virtual models of a physical location. In an embodiment, a method of generating a 3D scene geometry includes obtaining a first plurality of images and corresponding distance measurements for a first vehicle trajectory; obtaining a second plurality of images and corresponding distance measurements for a second vehicle trajectory, the second vehicle trajectory intersecting the first vehicle trajectory; registering a relative vehicle position and orientation for one or more segments of each of a first vehicle trajectory and a second vehicle trajectory; generating a 3D geometry for each vehicle trajectory; mapping the 3D geometry for each vehicle trajectory onto a common reference system based on the registering; and merging the individual 3D geometries from both trajectories to generate a complete 3D scene geometry.

In a further embodiment, a method for removing spurious objects from a scene geometry includes: creating a mesh from a set of distance measurements; segmenting the mesh into a plurality of regions; identifying a depth for each point in a region in the plurality of regions; classifying points in the region having a depth variance above a continuity threshold as indicative of a foreground or spurious object; and removing the region from the mesh when a number of points classified as indicative of a foreground or spurious object satisfy a classification threshold.

In an embodiment, a system for generating a depth map includes: a route and image repository that stores at least one image corresponding to a geographic location; a depth information repository that stores depth measurements for objects at the geographic location; an image selector that identifies the at least one image as corresponding to the geographic location; a façade model generator that generates a façade model using information from the depth information repository; and a 3D renderer that projects a 3D geometric scene geometry based on the façade model onto the at least one image to create a depth map.

In an embodiment, a computer readable storage medium has instructions stored therein that, when executed by a processing device, cause the processing device to execute a method for generating a 3D scene geometry, the method including: obtaining a first plurality of images and corresponding distance measurements for a first vehicle trajectory; obtaining a second plurality of images and corresponding distance measurements for a second vehicle trajectory, the second vehicle trajectory intersecting the first vehicle trajectory; registering a relative vehicle position and orientation for one or more segments of each of a first vehicle trajectory and a second vehicle trajectory; generating a 3D geometry for each vehicle trajectory; mapping the 3D geometry for each vehicle trajectory onto a common reference system based on the registering; and merging the 3D geometries from both trajectories to generate a complete 3D scene geometry.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Figure 1:
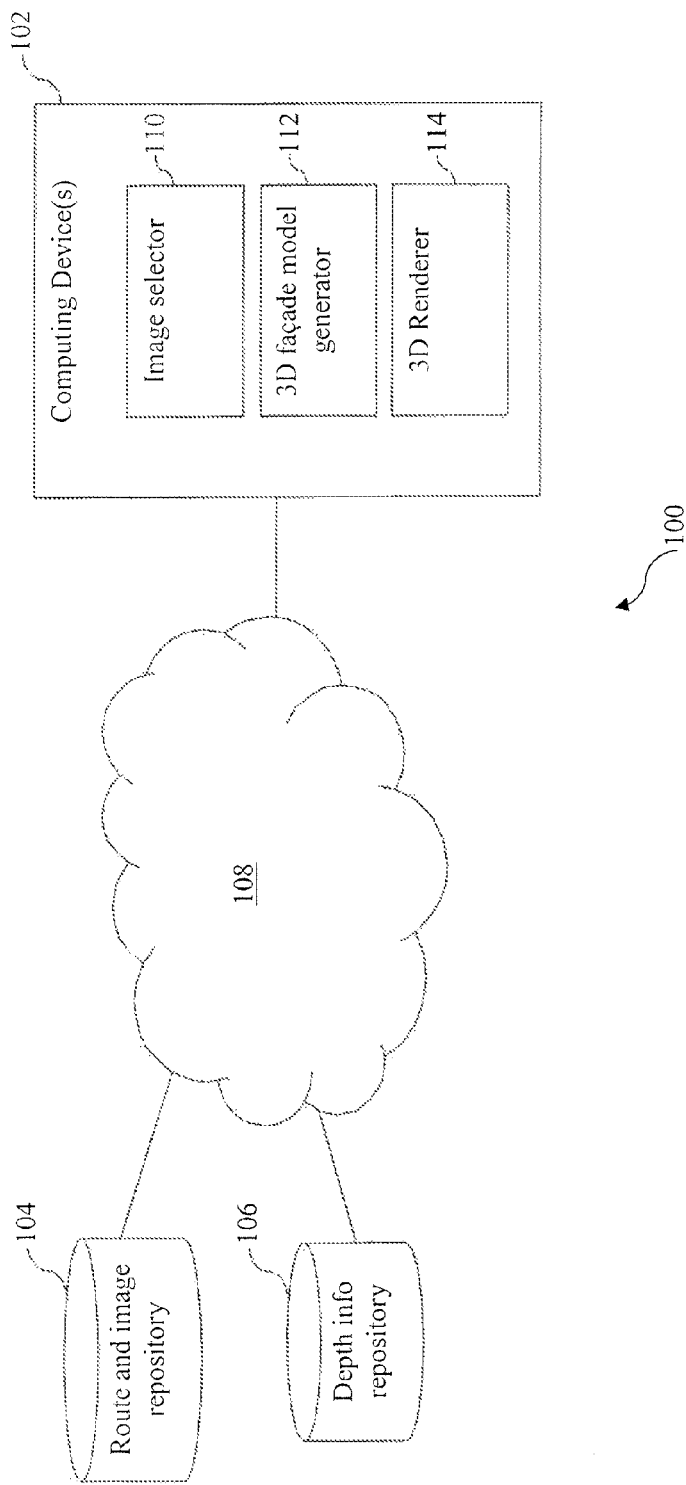
FIG. 1 is an architecture diagram of a system for generating 3D panoramic images according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Panoramic views of buildings, such as those provided by STREET VIEW™, produced by Google Inc. of Mountain View, Calif., allow a user to obtain panoramic views from various positions along many streets in the world. The images may be obtained by interpolating and warping images collected by a set of cameras mounted on vehicles. The vehicles are driven along regions of interest while images and the vehicle locations are recorded. In some embodiments, images and locations may be obtained at regular time intervals. Alternatively, images and locations may be obtained at regular distance intervals.

In addition to the cameras that record the images, embodiments may use a device such as a GPS location sensor to provide location information. Combining image information with appropriate location information using certain algorithms allows embodiments to map the images onto the 3D model.

As will be described in further detail below, in order to extend the utility of such imaging systems to include three-dimensional ("3D") features, a depth map of objects present in the scene (e.g., buildings) may be produced. Such a depth map associates each point in a given panoramic image with a distance from a viewpoint. To reconstruct depth maps, a vehicle capturing panoramic images may also include a distance measurement device, such as a laser rangefinder. The distance measurement device measures the distance between the device and one or more objects in the scene captured by an image. These distance measurements are then associated with the various components of the image, providing a record of how far each of the features in the images are from the camera. In an embodiment, multiple distance measurement devices are used to measure distance both orthogonally and parallel to the vehicle trajectory. When combined with a panoramic image captured at each respective location, a complete geometry for the scene may be reconstructed.

Although embodiments will be described below in the context of generating 3D panoramic images, one of skill in the art will recognized that the 3D geometries may also be used for other applications. For example, such geometries can also be used for rendering 3D models in a geographic information system (GIS), such as Google Earth, produced by Google Inc of Mountain View, Calif.

If only side-facing (i.e., measuring distances to objects approximately parallel to the vehicle trajectory) distance measurement devices are used, distances to surfaces (e.g., building surfaces) oriented orthogonally to the vehicle trajectory cannot be measured. This occurs, for example, when the vehicle crosses an intersection or when buildings are not contiguous along the street. In these cases, walls or other surfaces orthogonal to the vehicle trajectory may be visible in a panoramic image, but no depth map for the orthogonal surfaces may be determined from the side-facing distance measurement devices. To mitigate this effect, measurements from a front-facing (i.e., measuring distances to objects approximately orthogonal to the vehicle trajectory) distance measurement device may be used. In an embodiment, 3D façades are reconstructed using information obtained from the side-facing distance measurement devices. It is then determined whether the scene geometry can be extended with additional depth information from the front-facing distance measurement device for façades at the edges of the reconstructed geometry.

The lack of depth information for object surfaces orthogonal to the vehicle trajectory can be further mitigated by combining geometries obtained from multiple vehicle trajectory segments. For example, the complete 3D scene geometry at a given intersection may be reconstructed using 3D geometries calculated for two separate vehicle trajectory segments measuring the intersection from differing perspectives.

3D Image Generation

FIG. 1 is an architecture diagram of a system for generating 3D panoramic images according to an embodiment of the present invention. As used herein, panoramic images can include, but are not limited to, images covering a wide angle field of view. In general, panoramic images capture a photograph from a viewpoint that includes all of the information contained in the direction that the camera faces. Panoramic images may be obtained using a camera that faces forwards, behind, or to one side of the base of a camera, but other orientations are possible in other embodiments. This can include spherical panoramic images that capture an image about a focal point which is at a center with a wide angle of view about the center. Spherical, cylindrical, arcuate, rectilinear, polygonal, or other types of panoramic images may be used. Panoramic images are used so as to provide as much information as possible when mapping the images onto the 3D model. The panoramic images may be captured along a route, such as, for example at street level, at a floor in a building, or at a flying altitude. As described herein, for the purposes of clarity, not to be limiting, the panoramic images are assumed to be spherical and captured at street level.

FIG. 1 shows system 100, according to an embodiment. System 100 includes a computing device 102, a route and image repository 104, and a depth information repository 106, coupled by one or more networks 108. Computing device 102 includes an image selector 110, a 3D façade model generator 112, and a 3D renderer 114. As used herein, the term "repository" includes, but is not limited to, table databases, hierarchical databases, network databases, relational databases, dimensional databases, and/or object-oriented databases.

Each of computing device 102, route and image repository 104, depth information repository 106, image selector 110, 3D façade model generator 112, and 3D renderer 114 may be implemented on one or more computing devices. Such a computing device can include, but is not limited to, a personal computer, mobile device such as a mobile telephone, PDA, smartphone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware may include, but is not limited to, a processor, memory, graphical user interface display, or a combination thereof. A computing device may include multiple processors or multiple shared or separate memory components. For example, a computing device may include a cluster computing environment or server farm.

Computing device 102, route and image repository 104, depth information repository 106, image selector 110, 3D façade model generator 112, and 3D renderer 114 may be implemented on one or more computing devices at the same or different locations. For instance, computing device 102, route and image repository 104, depth information repository 106, image selector 110, 3D façade model generator 112, and 3D renderer 114 may be remote from one another or on different computing devices coupled to a network, such as network 108. Other combinations and configurations for arranging computing device 102, route and image repository 104, depth information repository 106, image selector 110, 3D façade model generator 112, and 3D renderer 114 may be used as would be apparent to a person skilled in the art given this description.

Network 108 may be any network or combination of networks that can carry data communication. Such a network 108 may include, but is not limited to, a local area network, medium area network, and/or wide area network such as the Internet. Network 108 can support protocols and technology including, but not limited to, World Wide Web protocols and/or services. Intermediate web servers, gateways, or other servers may be provided between components of system 100 depending upon a particular application or environment.

According to the embodiment of FIG. 1, computing device 102 includes image selector 110, 3D façade model generator 112, and 3D renderer 114. Image selector 110 identifies and organizes images, such as panoramic images, to include in a 3D rendering of a scene structure associated with a given geographical route (also referred to herein as a vehicle trajectory). In an embodiment, metadata stored with the image may indicate the geographic location of the respective image. Image selector 110 may use the metadata to automatically identify those images that correspond to the given geographical route. In a further embodiment, image selector 110 may automatically select different images based on the locations of images along the geographical route, the type of route (e.g., a highway, a residential street, etc.), the resolution of images, and/or other criteria.

Route and image repository 104 contains a plurality of images, such as panoramic images (as discussed above), associated with a respective geographic location. In an embodiment, route and image repository 104 contains multiple images for a single geographic location. These images may represent different two-dimensional views of the location. This may be the case for some or all of the geographic locations accounted for by the images stored in route and image repository 104. As an example, not to be limiting, route and image repository 104 may store panoramic images associated with respective locations every two meters along a route.

Depth information repository 106 includes depth measurements for objects associated with a respective geographic location. In an embodiment, depth information is obtained from a distance measurement device that measures distances from a camera imaging a scene to one or more objects in the scene. A laser rangefinder, for example, scans the scene with a laser beam moving linearly and returns the distance of an object encountered by the beam. Although embodiments will be described herein with reference to a laser rangefinder, one of skill in the art will recognize that other distance measurement devices may be used, such as sonar, radar, time-of-flight sensor, etc. In an embodiment, the depth information for a scene at the geographic location is obtained at the same time an image of the scene is obtained. The depth information may be associated with features in the image so as to provide a depth map that reflects the distance of different features in the image. This depth image can be used to help facilitate the geometric algorithms that map two dimensional images into a 3D model, as performed in 3D renderer 114.

Figure 2:
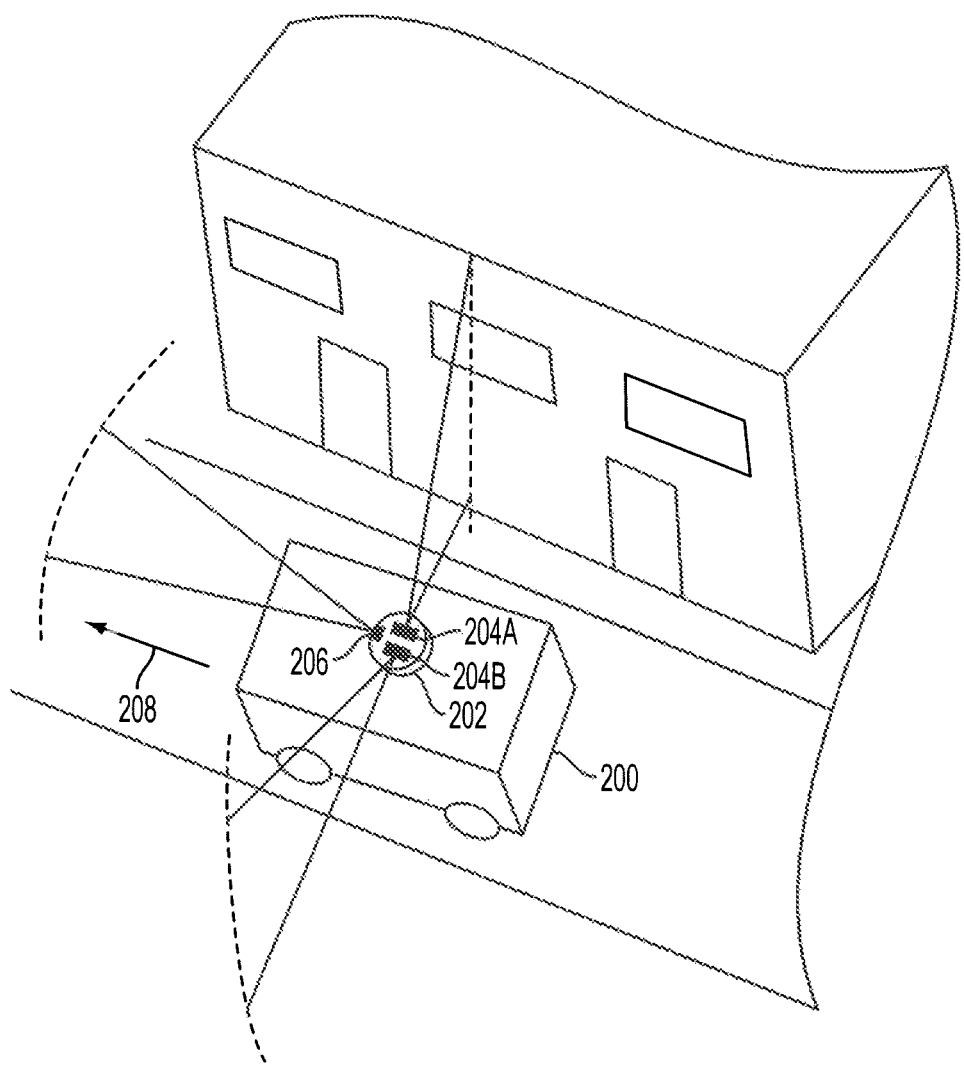
FIG. 2 illustrates an exemplary vehicle 200 having both imaging and distance measurement devices, according to an embodiment.

In an embodiment, multiple distance measurement devices are located on a vehicle that images scenes along a geographic route, also referred to herein as a vehicle trajectory. FIG. 2 illustrates an exemplary vehicle 200 having both imaging and distance measurement devices, according to an embodiment. Mounted on vehicle 200 are imaging device 202, side-facing distance measurement devices 204A and 204B, and front-facing distance measurement device 206. As discussed, the distance measurement devices may be laser rangefinders. One of skill in the art will recognize that other configurations and/or combinations of imaging devices and distance measurement devices may also be used.

As vehicle 200 proceeds along its trajectory 208, images are captured by imaging device 202. In an embodiment, the captured images are panoramic images (as discussed above). Imaging device 202 may include multiple cameras that capture multiple panoramic views at a time. Depth measurements are also captured. In an embodiment, side-facing measurement devices 204 measure distances along respective vertical lines of objects parallel to vehicle trajectory 208, while front-facing measurement device 206 measures distances along a horizontal line of objects orthogonal to vehicle trajectory 208. The measured distances are then stored in depth information repository 106, along with respective geographic location information as determined by the location sensor.

Figure 3A:
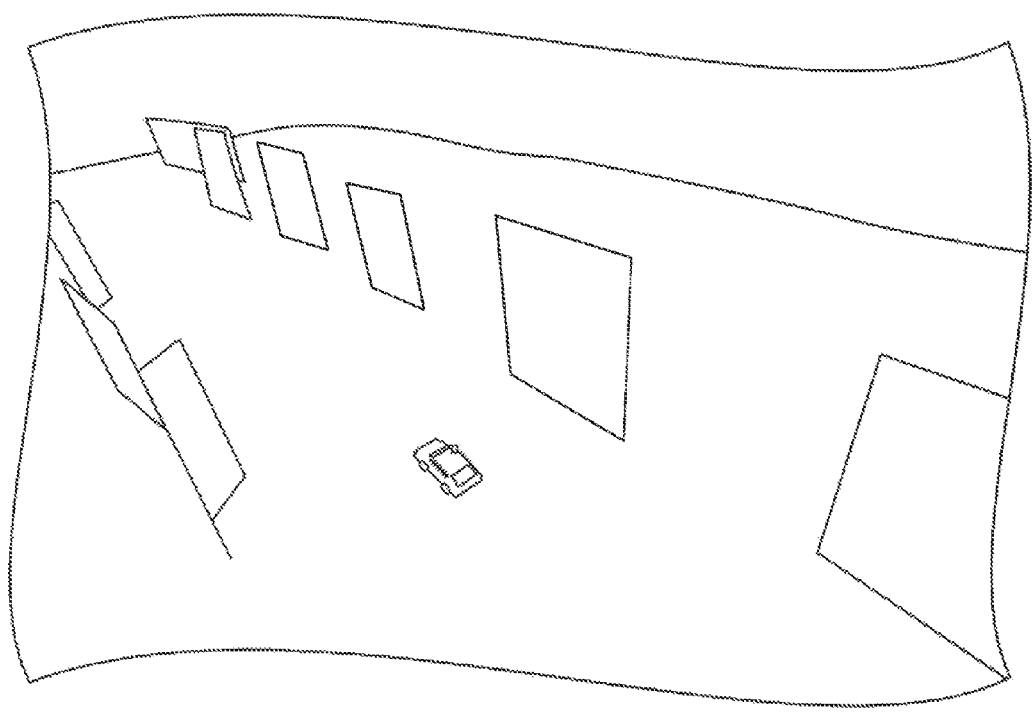
FIG. 3A illustrates an exemplary 3D scene geometry reconstructed from side-facing depth measurements of a measuring vehicle, according to an embodiment.

Returning to FIG. 1, 3D façade model generator 112 uses the measured distances stored in depth information repository 106 to reconstruct the geometry of one or more objects in a scene corresponding to a given location. This reconstructed geometry is referred to herein as a 3D façade model. FIG. 3A illustrates an exemplary 3D façade model reconstructed from side-facing depth measurements of a measuring vehicle, according to an embodiment.

In an embodiment, 3D renderer 114 projects an image in route and image repository 104 onto the 3D façade model generated by 3D façade model generator 112. A 3D façade for the reconstructed scene structure is thereby created, with images mapped onto the 3D surfaces to provide a two-dimensional view of the 3D scene. Exemplary systems and methods for projecting an image onto an underlying 3D surface are discussed in U.S. Patent Appl. Publ. No. 2009/0256840, filed Oct. 15, 2009, and U.S. patent application Ser. No. 12/568,235, filed Sep. 28, 2009, each of which is incorporated by reference herein in its entirety.

As illustrated in the example of FIG. 3A, side-facing depth measurement devices, such as devices 204, may only provide depth information for object surfaces parallel to the vehicle trajectory. They cannot capture details of object surfaces orthogonal to the trajectory. Surface façades for the 3D models can be generated using this information, but only for surfaces that are not orthogonal to the vehicle trajectory. This is problematic, for example, when the imaging vehicle crosses an intersection or when the buildings are not contiguous along the street. In these cases, a wall or other object having a surface orthogonal to the vehicle trajectory may be visible in a captured image, but no 3D model may be generated from the side-facing distance measurement devices for the orthogonal surface. This situation results in incomplete 3D models of the surroundings of the vehicle.

Figure 3B:
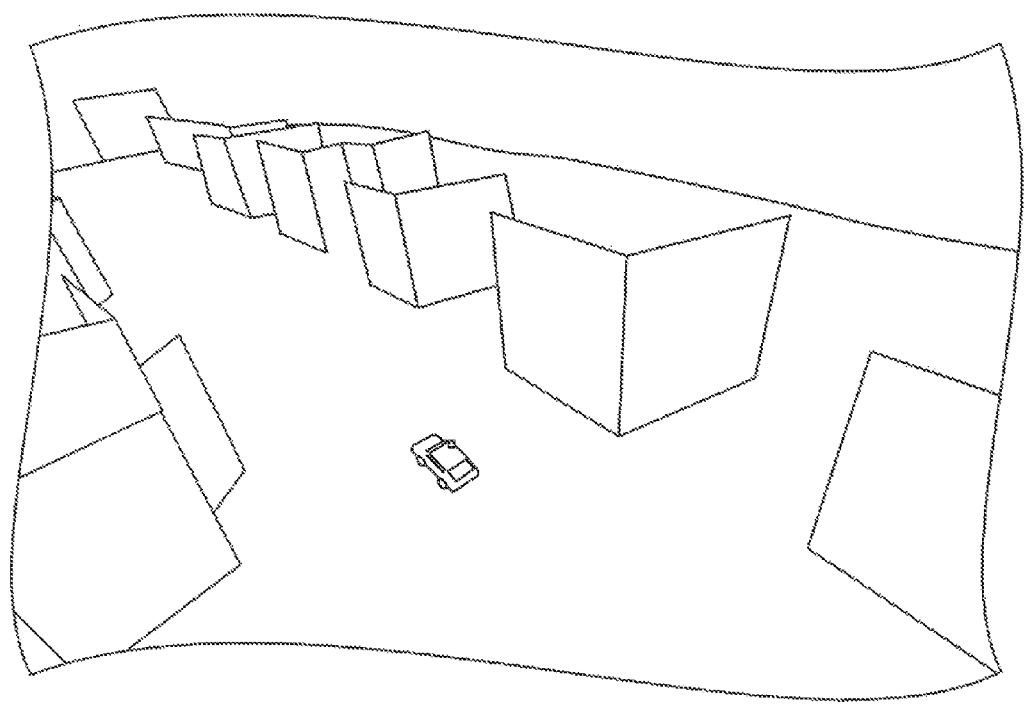
FIG. 3B illustrates an exemplary 3D scene geometry reconstructed from side- and front-facing depth measurements of a measuring vehicle, according to an embodiment.

In an embodiment, to mitigate this effect, depth measurements from a front-facing distance measurement device, such as device 206, may be used by, for example, 3D façade model generator 112 to reconstruct a scene geometry corresponding to an orthogonal surface, and to add the reconstructed scene geometry to a depth map. As the vehicle passes by orthogonal surfaces, it will record depth, location, and image data related to these surfaces, which will help complete the 3D model with information that reflects the orthogonal surfaces in the model. Portions of an image corresponding to an orthogonal surface can then be projected onto the portion of the depth map corresponding to the orthogonal surface. FIG. 3B illustrates such a reconstructed scene geometry, according to an embodiment.

In an embodiment, such scene geometries are output to and/or displayed on a computing device (or a display thereof), such as computing device 102. The computing device may be a general-purpose computer with a processor, local memory, display, and one or more computer input devices such as a keyboard, a mouse, and/or a joystick. Alternatively, the computing device can be a specialized computing device such as, for example, a mobile handset. Such a mobile handset may use as its interface a touchscreen or one or more control buttons. The computing device may communicate with one or more servers over one or more networks, such as the Internet. Similar to the computing device, the server can be implemented using any general-purpose computer capable of serving data to the computing device.

Combining Vehicle Trajectories

Additionally or alternatively, if depth information is not available from a single vehicle trajectory for all surfaces represented in an image, 3D geometries generated from different vehicle trajectories may be combined to render a complete 3D geometry of an intersection or other scene having surfaces at various angles to a viewpoint. By combining different viewpoints, appropriate mathematical algorithms may be used to determine distances and locations associated with images generated from different vehicle trajectories.

One example of this is at an intersection between two streets. If both of the streets entering an intersection have been explored by an imaging vehicle (during the same vehicle trajectory or a different vehicle trajectory), images, location information and corresponding depth information exist for both a vehicle trajectory along a first street and a vehicle trajectory along an intersecting street. The geometries estimated along each segment can be combined to provide a complete geometric model at the intersection. Although reference will be made herein to embodiments using two vehicle trajectories to create a complete 3D geometric model, one of skill in the art will recognize that any number of vehicle trajectories (e.g., three, four, etc.) may be combined to render a complete 3D geometric model by combining the information from the vehicle trajectories using appropriate algorithms.

One can use a "route repository" to efficiently find which vehicle trajectories to align and merge. That is, the vehicle trajectories are snapped to road segments. The route repository (i.e. road network) can be used to find out which roads intersect and therefore which vehicle trajectories to merge.

Figure 4:
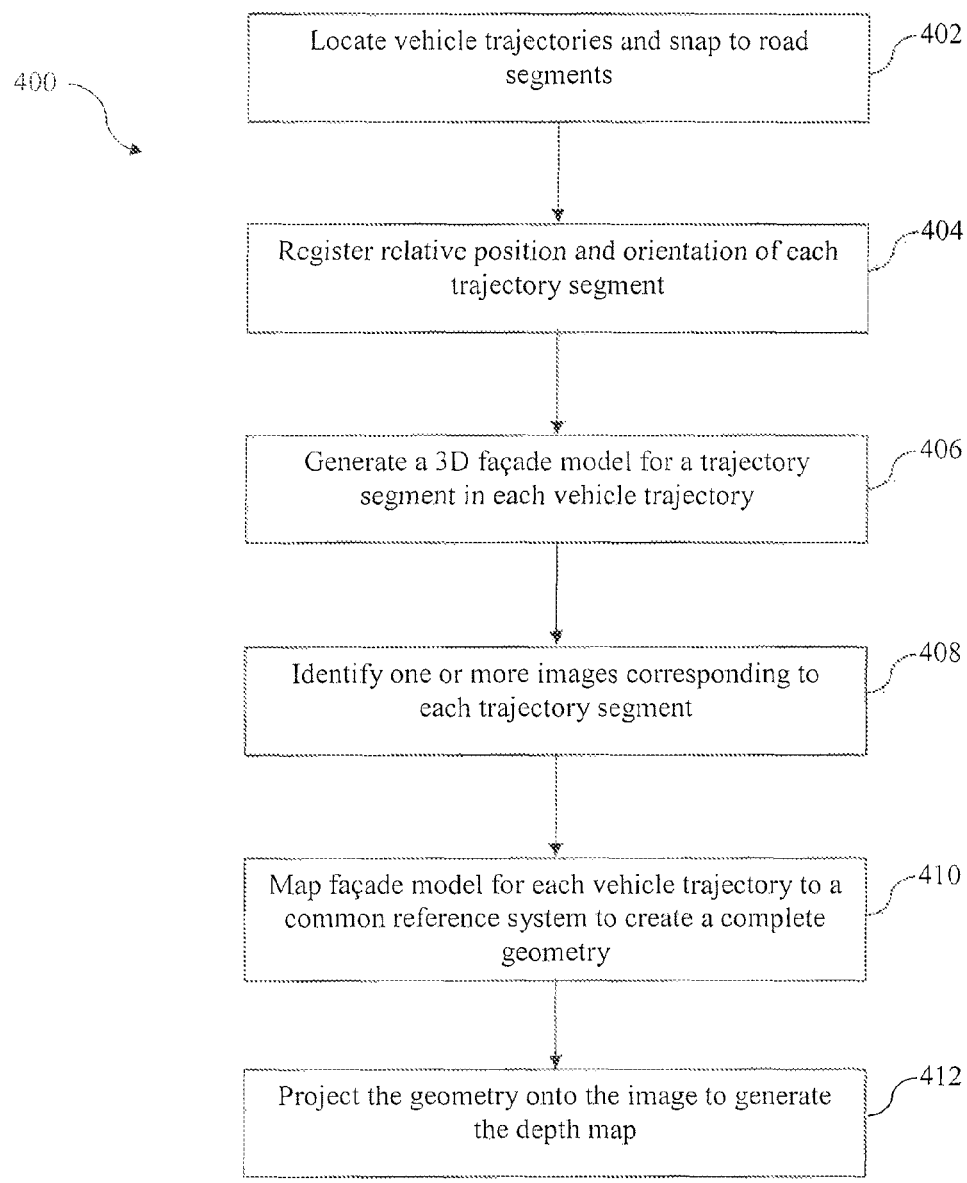
FIG. 4 illustrates a method 400 for providing 3D façades for scene geometries at the intersection of two vehicle trajectories, according to an embodiment.

FIG. 4 illustrates a method 400 for providing 3D façades for scene geometries at the intersection of two vehicle trajectories, according to an embodiment. In stage 402, intersecting vehicle trajectories are located and snapped to corresponding road segments. This may be accomplished, for example, by using a repository of maps that contain road segments and intersections, such as the database for Google Maps, produced by Google Inc. of Mountain View, Calif. Additionally, location data associated with the images may be used to aid in this process. This repository of maps may be the same as or in addition to route and image repository 104 of FIG. 1. In an embodiment, two intersecting vehicle trajectories are located, a first vehicle trajectory corresponding to a first vehicle and a second vehicle trajectory corresponding to a second vehicle. In another embodiment, both vehicle trajectories correspond to the same vehicle at different times.

In stage 404, the relative vehicle position and orientation of each trajectory segment may be registered using measurements from, for example, a front-facing distance measurement device. Registration may be accomplished using, for example, techniques described in U.S. patent application Ser. No. 11/870,265, filed Oct. 10, 2007, incorporated by reference herein in its entirety. A trajectory segment may be defined by, for example, the geographic length of a trajectory that corresponds to a given panoramic image. In an embodiment, registration includes automatically aligning distance measurement information from two intersecting trajectories.

In stage 406, a 3D façade model is generated for a trajectory segment of each vehicle trajectory. Façade models may be generated using, for example, 3D façade model generator 112 of FIG. 1 as described above.

In stage 408, one or more images corresponding to each trajectory segment are also identified.

In stage 410, each 3D façade model is mapped onto a common reference system using the registrations of stage 404 to create a complete 3D geometry. Because the 3D geometries based on two different vehicle trajectories are mapped to a common reference system, the edges of the façades at different angles automatically align without a need to merge the underlying depth maps.

In stage 412, the complete 3D scene geometry is projected onto the image to create a depth map.

Spurious Object Detection and Removal

In addition to measuring the distance to an object of interest, such as a building, distance measurement devices also measure the distances to points of small objects. These small objects may inhibit or perturb the reconstruction of the scene geometry, as they may occlude a primary object of interest in the scene. In an embodiment, measurements corresponding to these small objects are removed so that they do not influence the reconstruction of the building geometry.

Exemplary small objects that may occlude the view of a façade to be mapped or that may otherwise be determined to be spurious include trees, bushes, light posts, trash cans, etc. that partially occlude the view of a building. Since the layout of buildings and other large-scale features is the information of primary interest to the user, small objects may be removed without sacrificing user functionality. According to an embodiment, a classifier is used that determines when the distance measurements in a certain region of an image are not building-like. This allows measurements associated with an occluding or spurious object to be removed from the building geometry. The remaining valid depth data may then be used to fit a façade model reproducing the walls of the building and/or other large objects present in the scene.

Figure 5:
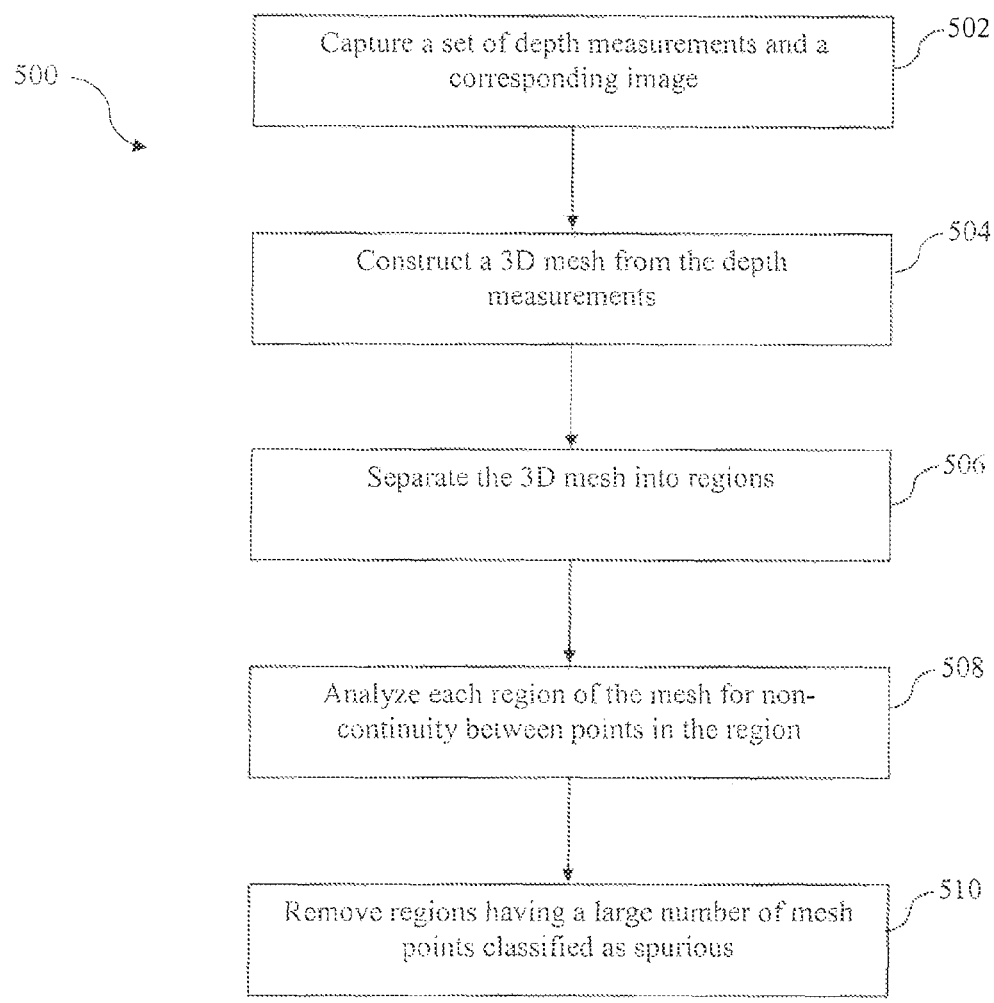
FIG. 5 is a flowchart of an exemplary method 500 for automatic occluding or spurious object detection and removal, according to an embodiment.

FIG. 5 is a flowchart of an exemplary method 500 for automatic spurious object detection and removal, according to an embodiment. In stage 502, a set of depth measurements and a corresponding image are captured. The set of depth measurements may be captured by, for example, a distance measurement device located on a vehicle, with the image captured by a camera located on the same vehicle.

In stage 504, a 3D mesh is constructed from the depth measurements.

In stage 506, the mesh is separated into regions.

In stage 508, each region of the mesh is analyzed for non-continuity between mesh points in the region. In an embodiment, non-continuity is identified for mesh points having a linearity less than three consecutive points in the horizontal and vertical directions. In an embodiment, non-continuity is identified for mesh regions having points that decrease in height even though the depth measurement device was scanning upwards when the depth measurements were taken. Mesh regions identified as non-continuous are classified as spurious (e.g., not building-like).

In stage 510, regions having a large number of points classified as spurious are removed. In an embodiment, a classification threshold is set such that a region is removed when the number of points classified as spurious satisfy the classification threshold. The classification threshold may be, for example and without limitation, a given percentage of points in the region.

Figure 6A:
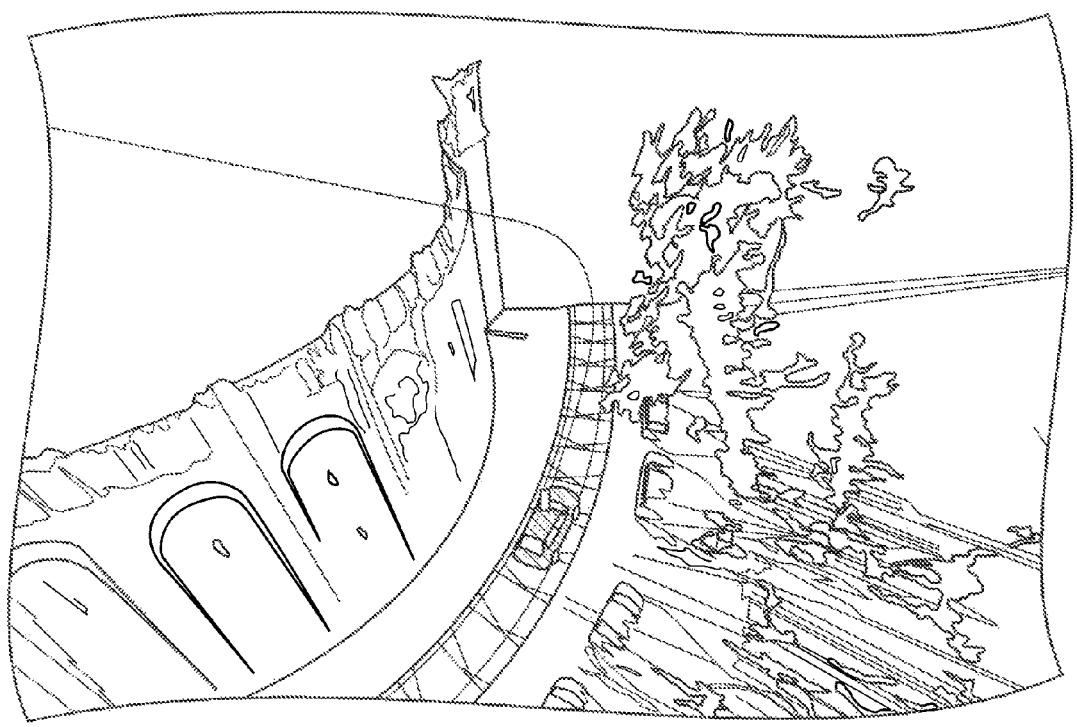
FIGS. 6A and 6B illustrate an exemplary 3D scene geometry generated using the method of FIG. 5, according to an embodiment.
Figure 6B:
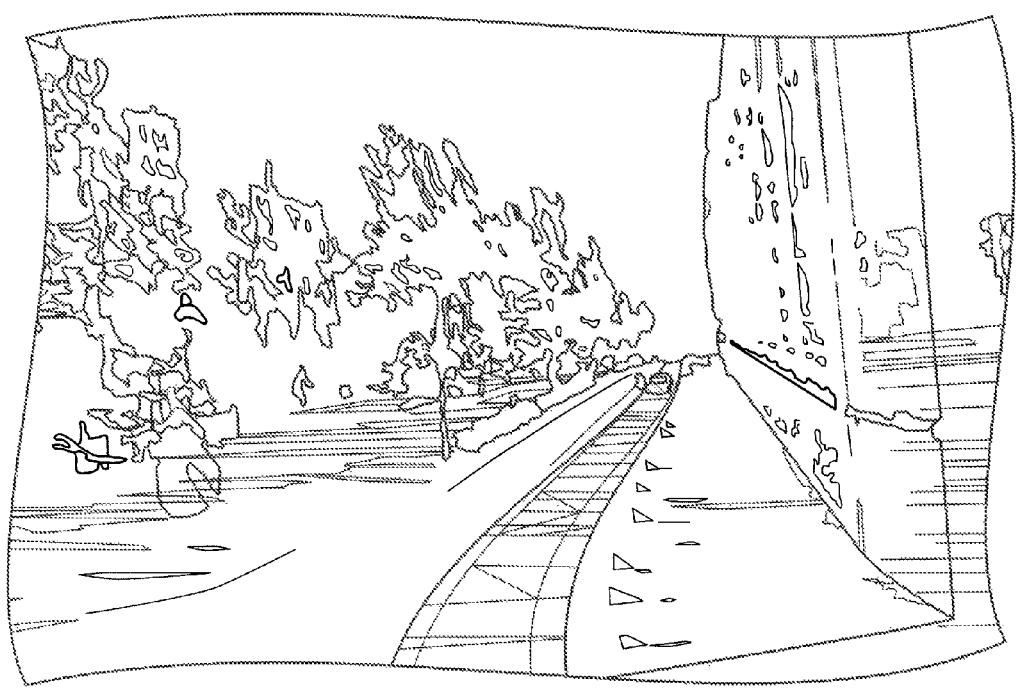

Example results of this method for automatic spurious object detection and removal are illustrated in FIGS. 6A and 6B. In an embodiment, method 400 is implemented by computing device 102. In another embodiment, method 400 is implemented by a computing device separate from computing device 102, such as a client device in a client/server system (not shown).

When occlusions are removed from a scene geometry, the removal may leave some portions of the geometry without depth detail. In an embodiment, a gap-closing technique is used to interpolate surface details onto the portions of the geometry for which information is not available. In another embodiment, depth information for a given surface from a front-facing distance measurement device can be used to provide missing surface details. In yet another embodiment, points in the occluding region having a depth similar to portions of the image outside the occluding region are assumed to be part of the dominant object of interest, and can be used to interpolate missing surface details. This embodiment is particularly useful for trees, where portions of a building surface may be captured through the tree leaves.

CONCLUSION

Embodiments may be implemented in hardware, software, firmware, or a combination thereof. Embodiments may be implemented via a set of programs running in parallel on multiple machines. In an embodiment, different stages of the described methods may be partitioned according to, for example, vehicle trajectory or intersection, and distributed on the set of available machines. The final result may include a table where the key is the vehicle trajectory and the content is the façade model obtained by one or more described embodiments.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A method of generating a three-dimensional scene geometry, comprising:

obtaining, by one or more computing devices, a first plurality of images and corresponding distance measurements for a first vehicle trajectory;

obtaining, by one or more computing devices, a second plurality of images and corresponding distance measurements for a second vehicle trajectory, the second vehicle trajectory intersecting the first vehicle trajectory;

registering, by one or more computing devices, a relative vehicle position and orientation for one or more segments of each of a first vehicle trajectory and a second vehicle trajectory, wherein registering comprises snapping vehicle trajectories to read segments;

generating, by one or more computing devices, a three-dimensional scene geometry for each vehicle trajectory;

mapping, by one or more computing devices, the three-dimensional scene geometry for each vehicle trajectory onto a common reference system based on the registering; and merging, by one or more computing devices, the individual scene geometries to generate a complete three-dimensional scene geometry, wherein merging comprises using a route repository to determine which roads intersect and therefore which vehicle trajectories to merge.

2. The method of claim 1, wherein merging the 3D scene geometries comprises filtering and trimming the mapped 3D scene geometries to fit the one or more plausible building structures.

3. The method of claim 1, wherein the distance measurements are laser rangefinder distance measurements.

4. The method of claim 1, wherein registering uses the corresponding distance measurements for the first and second vehicle trajectories.

5. The method of claim 1, wherein the distance measurements corresponding to each vehicle trajectory include measurements to objects parallel to the vehicle trajectory and measurements to objects orthogonal to the vehicle trajectory.

6. The method of claim 1, wherein the objects parallel to the vehicle trajectory are located to the side of a vehicle and the objects orthogonal to the vehicle trajectory are located in front of or behind the vehicle.

7. The method of claim 1, wherein the first and second vehicle trajectories are trajectories of the same vehicle.

8. The method of claim 1, wherein the first vehicle trajectory is a trajectory of a first vehicle and the second vehicle trajectory is a trajectory of a second vehicle.

9. A non-transitory computer readable storage medium having instructions stored therein that, when executed by a processing device, cause the processing device to execute a method for generating a three-dimensional scene geometry, the method comprising:

obtaining a first plurality of images and corresponding distance measurements for a first vehicle trajectory;

obtaining a second plurality of images and corresponding distance measurements for a second vehicle trajectory, the second vehicle trajectory intersecting the first vehicle trajectory;

registering a relative vehicle position and orientation for one or more segments of each of a first vehicle trajectory and a second vehicle trajectory, wherein registering comprises snapping vehicle trajectories to road segments;

generating a three-dimensional scene geometry for each vehicle trajectory;

mapping the three-dimensional scene geometry for each vehicle trajectory onto a common reference system based on the registering; and merging the individual scene geometries to generate a complete three-dimensional scene geometry, wherein merging comprises using a route repository to determine which roads intersect and therefore which vehicle trajectories to merge.

10. The computer readable storage medium of claim 9, wherein the instructions for merging the 3D scene geometries further comprise instructions for filtering and trimming the mapped 3D scene geometries to fit the one or more plausible building structures.

* * * * *